Figure 1:
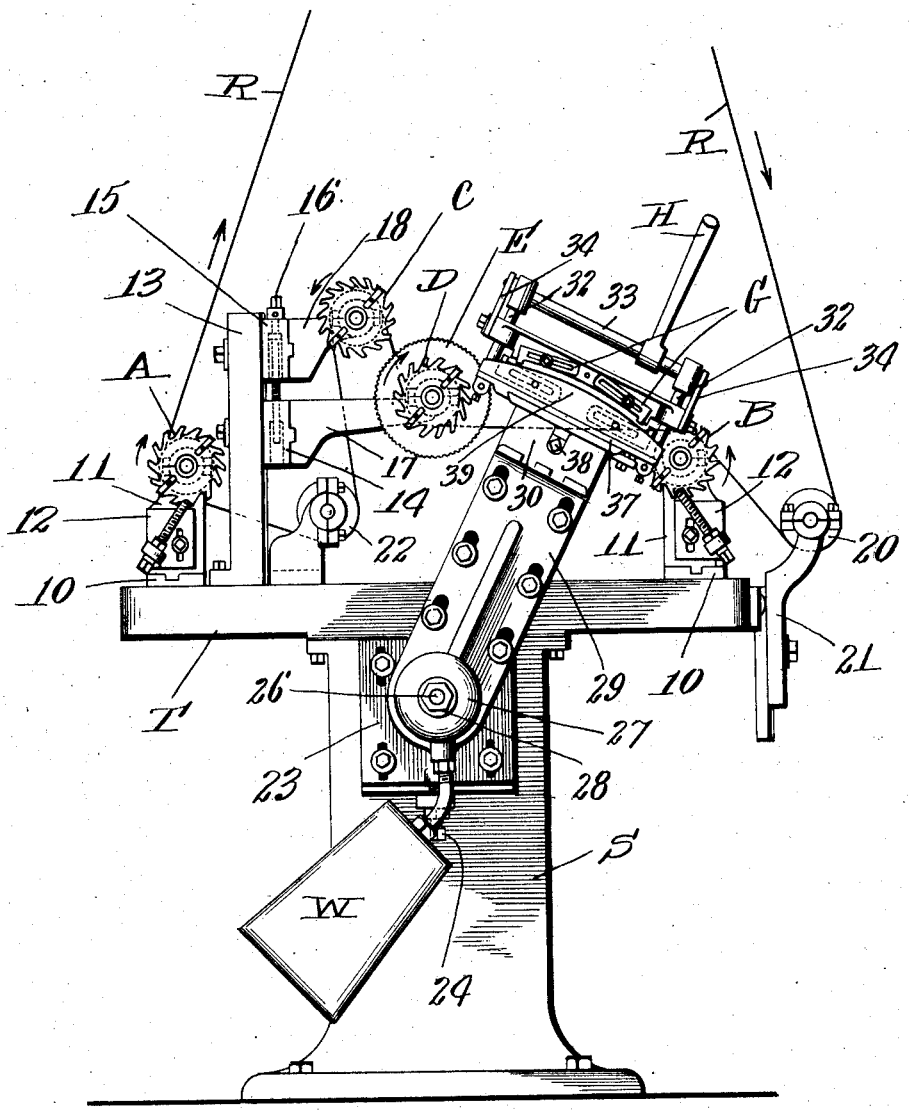

No. 874,007. PATENTED DEC. 17, 1907.
W. H. HOBBY.
TENONING MACHINE.
APPLICATION FILED FEB. 2, 1905.

3 SHEETS—SHEET 1.

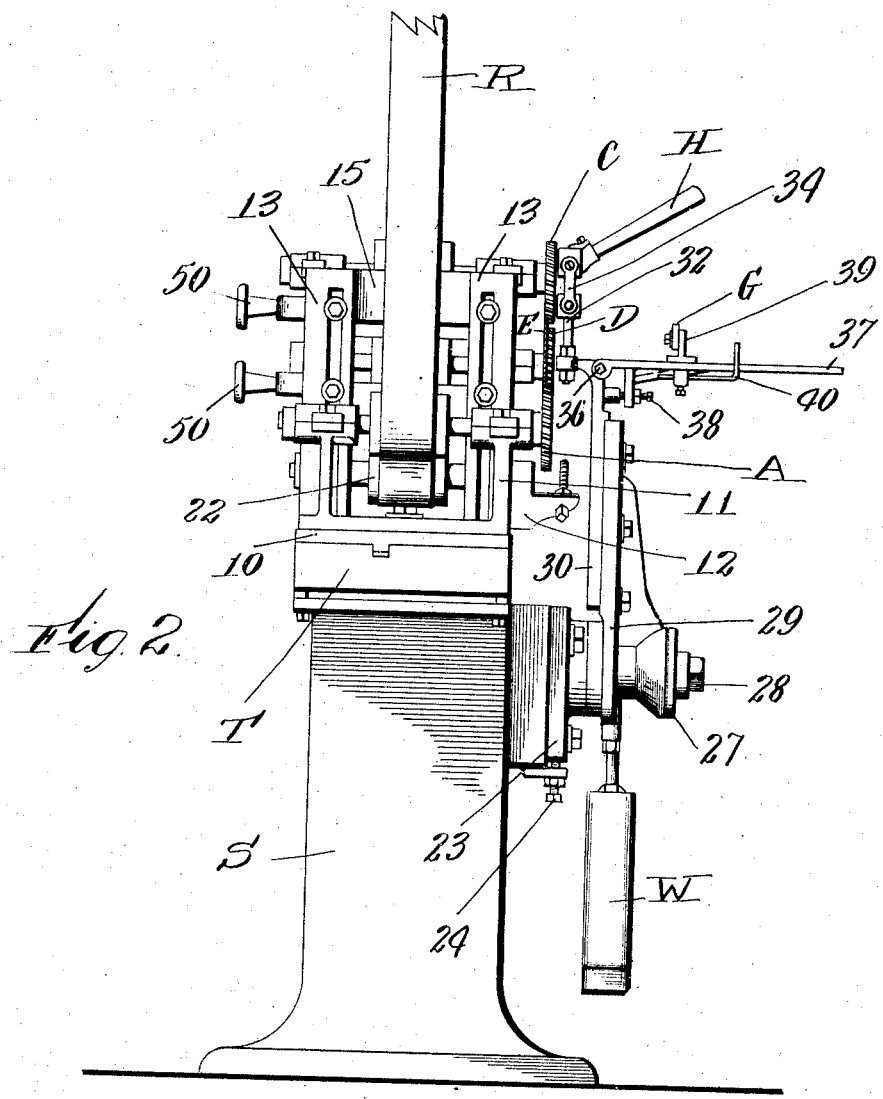

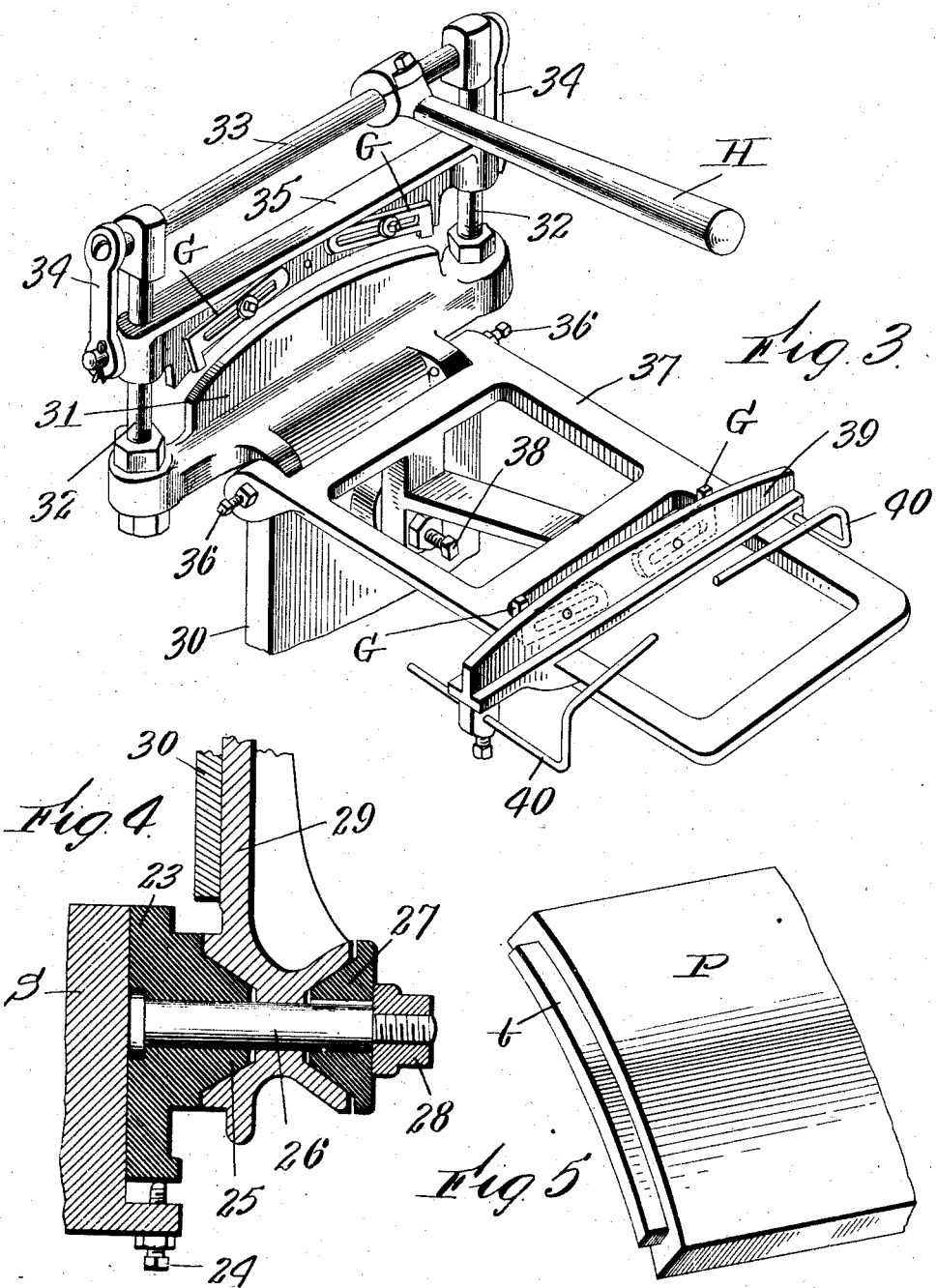

UNITED STATES PATENT OFFICE.

WILLIAM H. HOBBY, OF GARDNER, MASSACHUSETTS.

TENONING-MACHINE.

No. 874,007. Specification of Letters Patent. Patented Dec. 17, 1907.

Application filed February 2, 1905. Serial No. 243,831.

*To all whom it may concern:*

Be it known that I, WILLIAM H. HOBBY, a citizen of the United States, residing at Gardner, in the county of Worcester and State of Massachusetts, have invented a new and useful Tenoning-Machine, of which the following is a specification.

This invention relates to a machine for cutting curved tenons.

The especial object of this invention is to provide a strong, simple and efficient machine which is intended to be used for shaping curved tenons to connect chair-backs to seats or to top pieces, or which may be used for other constructions in which it is desired to form curved tenons.

To this end this invention consists of the tenon-cutting machine and of the combinations of parts therein as hereinafter described and more particularly pointed out in the claims at the end of this specification.

In the accompanying three sheets of drawings, Figure 1 is a side view of a machine constructed according to this invention. Fig. 2 is an end view thereof. Fig. 3 is a perspective view partly broken away of the carriage in which the chair-back or other work is clamped. Fig. 4 is a detail sectional view of the cone-bearings on which the carriage is pivoted, and Fig. 5 is a detail view showing the work done upon a machine constructed according to this invention.

Heretofore in manufacturing chairs having solid or panel-shaped back-pieces it has been the practice to connect the backs with the chair-seats by means of mortise and tenon joints.

In many designs of chairs the back-pieces or panels are curved to conform to the curve of the back edges of the chair-seats, and I have found in practice that it is desirable that the tongue or tenon which is to connect a back-piece with a chair-seat should be of a corresponding curve in order to form the neatest possible joint and one having the greatest strength.

The present invention relates to a machine which has been especially designed for shaping curved tenons or tongues upon the ends of chair-backs to connect the parts by means of joints of the kind referred to, although the machine may be used for any class of work in which it is desired to form a bow-shaped or curved tenon upon the end of a piece of work.

In a machine constructed according to this invention, rotary cutters are adjustably mounted upon the table of the machine, and the carriage in which the work is clamped moves the work in a curved path while the same is being acted upon by the cutters.

In practice I use four cutters for shaping the sides and edges of the curved tenon, and one of the cutters is provided with a circular saw for cutting the tenon to proper length. In practice, also, the carriage is preferably pivoted upon cone-bearings which can be adjusted to vary the radius of curvature of tenon to be shaped, and the carriage is also preferably counter-balanced so that it will be normally held in place between the cutters while the work is being clamped therein.

Referring to the drawings and in detail, a tenon cutting machine constructed according to this invention is herein illustrated as comprising the base or standard S. Mounted upon the standard S is the table T.

As shown most clearly in Fig. 2, the table T is provided with a groove or way, and adjustably mounted in the groove or way are supporting pieces 10 carrying the transversely adjustable bearings 11, in which are journaled the shafts of the edge cutters A and B which trim the edges of the curved tenon. Also carried by the bearing pieces 11 are the adjustable plates 12, each of which is provided with a stop-screw for limiting the swinging motion of the carriage as hereinafter described.

Extending up from the table T of the machine are uprights 13, and vertically adjustable on the uprights 13 are supports 14 and 15. The supports 14 and 15 are connected together by adjusting screws 16, and are clamped in their adjusted positions by means of clamp-screws extending through slots in the uprights 13.

By loosening the clamping screws of the piece 15 the said piece 15 may be adjusted vertically by turning the screw 16, and when the piece 15 is fastened in its adjusted position and the clamping screws of the piece 14 are loosened, the vertical adjustment of the piece 14 may also be regulated by turning the screws 16. That is to say, by connecting the two independent pieces 14 and 15 by the adjusting screws 16, either one of said pieces may be adjusted to the desired position when the other piece is fastened.

Transversely adjustable upon the pieces 14 and 15 respectively are the bearing pieces 17 and 18 which can be transversely adjusted by means of the screws 50 (shown in Fig. 2), and journaled in the bearing pieces 17 and 18 respectively are the shafts of the top and bottom cutters C and D. Fastened on the shaft of the bottom cutter D is a circular saw E for trimming the end of the tenon. By means of this construction it will be seen that I have provided four cutters A, B, C, D for trimming the ends and sides of a tenon respectively, and have also provided one of the cutters D with a circular saw E for trimming the end of the tenon.

All of the cutters are driven from a single driving belt R, said driving belt passing around an adjustable idler pulley 20 carried in an adjustable bracket 21, and around the pulleys upon the shafts of the cutters, and also around the second idler pulley 22.

In practice a considerable space is left between the cutters B and D, and the swinging carriage is preferably counter-balanced so that the carriage will stand opposite the space between said cutters.

The detail construction of the carriage and the way in which the carriage is pivotally mounted upon the frame of the machine are most clearly illustrated in the third sheet of drawings.

Adjustably mounted on the stand of the frame S of the machine as shown in Fig. 4, is a plate 23 which can be adjusted vertically by a screw 24 and clamped in its adjusted positions. Extending from the face of the plate 23 is a cone 25, and concentric with the cone 25 is a stud 26. Keyed onto the stud 26 is a second cone 27 which is clamped in place by a nut 28. Pivotally mounted between the cones 25 and 27 is the frame or arm 29 of the carriage, and adjustably clamped to the part 29 is the upright 30. The upright 30 is provided at its upper end with a curved bearing 31 which forms the lower part of the work-clamp. At each side of the curve 31 are guide-posts 32 which may be adjusted vertically by stop-nuts. At the upper ends of the posts 32 are bearing pieces in which is journaled a clamp shaft 33 having crank-pins at its ends which are connected by links 34 to the clamping frame 35, which moves up and down upon the guide-rods 32.

The clamping shaft 33 is provided with a forwardly extending handle H, and by turning the handle H the clamp may be opened or the work fastened in place with a strong clamping action as desired, the adjustment of the guide-rods 32 serving to adjust the clamp to different thicknesses of work, and the stops G serving to hold the work in sidewise position.

Pivotally connected with the uprights 30 by means of center screws 36 is a bracket 37, and extending down from the bracket 37 is an arm carrying an adjusting screw 38 for swinging the bracket to different positions to support the end of the piece of work or board being operated upon. Adjustably mounted upon the bracket 37 is a curved arch or support 39, upon which the work rests, and upon which the same may be adjusted sidewise by means of the stops G. Also adjustably connected with the arch or rest 39 are the end stops 40 which may be set up to engage the end of the work.

Connected with the carriage and extending down below the pivotal support or bearing thereof is a heavy counterweight W, as shown in Fig. 1, and this counterweight W serves to hold the carriage in a position opposite the space between the cutters D and B in position to facilitate the insertion and removal of the work.

In the operation of a complete machine as thus constructed, a curved piece or board P as shown in Fig. 5, for a chair-back or for other purposes may be clamped in place in the carriage, and by then rocking or oscillating the carriage the ends of a curved tenon $t$ will be formed by the cutters A and B, and the tenon will be cut to proper length by the circular saw E.

If desired the tenon $t$ may be formed at an angle with the body portion of the chair-back or piece P, and variations of this angle can be secured by swinging up or down the bracket 37 which supports the opposite end of the work.

I am aware that numerous changes may be made in practicing my invention as set forth in the claims by those who are skilled in the art and that a machine constructed according to this invention may be used for other purposes besides its use in the manufacture of chairs. I do not wish, therefore, to be limited to the particular construction I have herein shown and described, nor to the use of my invention as applied to the manufacture of chair-backs alone, but What I do claim and desire to secure by Letters Patent of the United States is:

1. In a wood working machine, the combination of a pivotally mounted work-holding clamp, said clamp having curved jaws, said jaws each having a bearing surface constituting a part of a cylindrical surface substantially concentric with the pivot on which the clamp is mounted.

2. In a wood working machine, the combination of a pivotally mounted work-holding clamp, said clamp having curved jaws, said jaws each having a bearing surface constituting a part of a cylindrical surface whose center is on a line substantially co-incident with the pivot on which the clamp is mounted, said clamp being adjustable on a line normal to the surface of said cylinders.

In testimony whereof I have hereunto set my hand, in the presence of two subscribing witnesses.

WILLIAM H. HOBBY.

Witnesses:
F. W. FENNO,
F. E. LAVALLEE.